July 23, 1963  M. W. DICKOVER ET AL  3,098,773
VENT COVER
Filed July 8, 1960
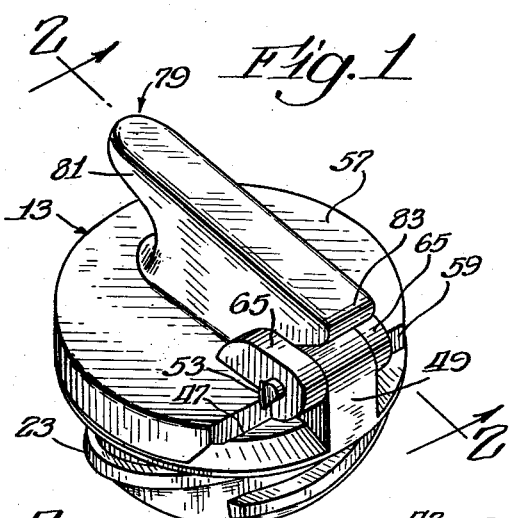
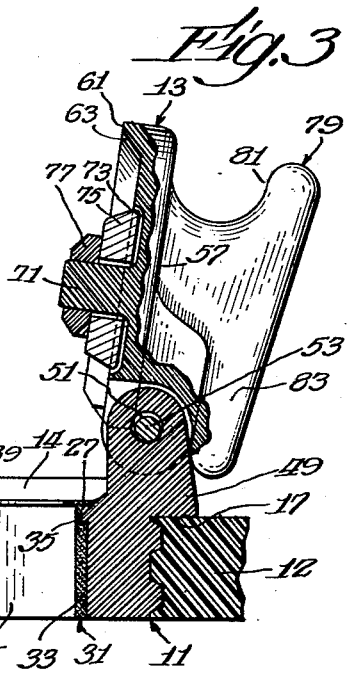
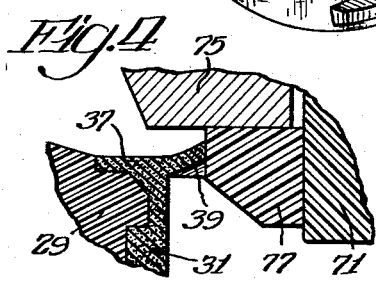
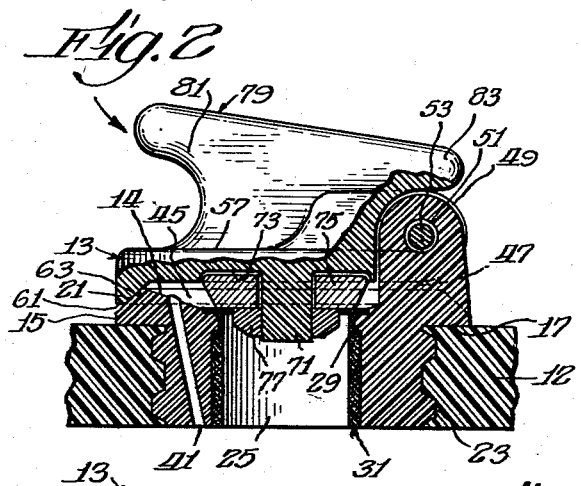
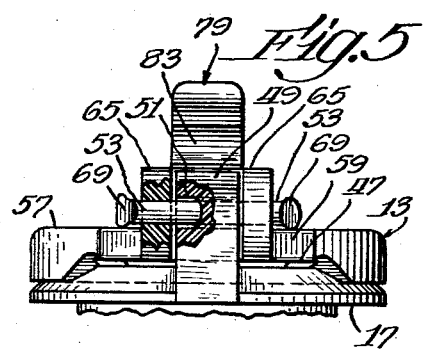
Inventors:
M. Ward Dickover
Joseph N. Jammal
By Soans, Anderson, Luedeka, & Fitch  Attys.

VENT COVER

Marion Ward Dickover, Glenview, Ill., and Joseph N. Jammal, Ashtabula, Ohio, assignors to K-W Battery Company, Skokie, Ill.
Filed July 8, 1960, Ser. No. 41,568
2 Claims. (Cl. 136—177)

This invention relates generally to storage batteries, and in particular to closures for the service openings in battery cases.

Storage batteries have been conventionally provided with closures or lids which permit closing of the cells of the batteries and also permit servicing of the batteries. These batteries are used in various mobile units, such as motor vehicles, railway equipment, submarines, etc. The previously known closures have provided various features and have provided for self-closing.

However, it is an object of the present invention to provide an improved battery closure of the type generally available, which closure has improved venting and improved closure feature. An additional object of the invention is to provide an improved battery closure which has improved sealing means which also maintains the lid in a closed position.

Other objects and advantages of the invention will become apparent with reference to the following description and enclosed drawings in which:

FIGURE 1 is a perspective view of a battery closure in accordance with the present invention;

FIGURE 2 is a partially sectioned view taken along line 2—2 of FIGURE 1 showing the closure with the lid in a closed position;

FIGURE 3 is a partially sectioned view of the closure of FIGURE 1 with the lid in the raised position;

FIGURE 4 is an enlarged detailed sectional view of the closure of FIGURE 1 showing the co-operation between certain elements as the lid is closed;

FIGURE 5 is a partially sectioned rear view of the closure of FIGURE 1; and

FIGURE 6 is a partially sectioned view of the closure showing an alternative method of construction of the means used to retain the closure in the battery case.

The closure shown in the preferred embodiment comprises a tubular base 11 which is proportioned to fit into a battery case 12 and a hinged lid 13 suitably fastened thereto. A flange 15, which is integral with the base, extends outwardly from the upper edge of the base so as to form a shoulder 17 which will abut the upper surface of battery case 12. The flange 15 is provided with a beveled rim 21 which extends outwardly and downwardly, and which co-operates with a beveled portion of the lid 13 (not yet described) to insure a close fit between the base and the lid. A conical section 14 extends inwardly and downwardly from the rim 21.

The base 11 is shown in FIGURES 1 through 3 as being provided with exterior threads 23 with which the base may engage threads formed on the battery case. A central bore 25 extends through the base and provides a passageway through which the battery is serviced. The bore 25 is shown in FIGURES 2 and 3 as being generally cylindrical and having an annular recess 27 at its upper edge. An interlocking ledge in the form of rib 29 which extends into the bore is provided adjacent the recess 27 and is adapted to position and hold a soft rubber bushing 31 within the bore.

The bushing 31 carried within the central bore 25 of the base, as shown in the drawings, has a circular groove 35 formed in its outer surface. The groove 35 is adapted to accommodate the rib 29 which extends into the bore 25 so as to maintain the bushing within the base. The bushing is removable because of its flexibility and can therefore be easily replaced should it become worn.

A flange 37 is provided on the upper edge of the bushing 31, which flange is pliable because of the soft rubber material of the bushing and is adapted to fit into the annular recess 27 of the base 11. The flange 37 also extends into the bore 25 to form a lip 39. The lip 39 cooperates with a portion of the lid 13 to maintain the lid in the closed position and provide a seal. The cooperation between the lip 39 and the lid is an important feature of the invention which will be more particularly described hereinafter.

The base 11 is also provided with a breather duct 41 which is shown best in FIGURES 2 and 3. The breather duct comprises a channel 43 extending from the conical section 14 of the base to a portion of the lower surface which will be in communication with the interior of the battery. The function of the duct is to provide a vent for the gases which are generated by the action of the battery during charging or evaporation.

The conical section 14 at the top of the base 11 is in association with the lid 13 and provides a chamber 45 between the base 11 and the lid 13 when the lid is closed as shown in FIGURE 2. Into this chamber 45 gases are received through the duct 41. The gases subsequently leave the chamber through the rear portion of the closure by means of the passageway 47 as can be seen in FIGURES 1 and 2. The conical shape of the section 14 will cause any liquid which may be spilled or splashed onto the section to flow down and to the flanges 37, over the lip 39 into the battery.

It may be noted at this time that in the illustrated embodiment, the breather duct 41 is covered by the lid 13 in such a manner that the duct will not be blocked or filled with falling material or debris. It is desirable to provide this protection for the upper end of the duct since such materials would have a tendency to plug this opening and interfere with the proper functioning of the battery. The chamber 45 and passageway 47 provide for escape of gases without danger of the plugging of the duct or passageway.

A hinge support 49 is located on the upper surface of the base 11 and is shown in the drawings as being provided with a journal 51 for a hinge pin 53.

The lid 13 is hingedly attached to the base, as before indicated, and comprises generally a flat circular plate 57 having a non-circular flattened portion 59 adjacent the hinge support 49 to facilitate opening and closing of the lid. A rim flange 61 generally surrounds the circular portion of the plate and extends downwardly toward the base, when the lid is in the closed position. The inner surface 63 of the flange is beveled so that it fits onto the beveled rim 21 of the base, as previously mentioned, to provide an intimately fitting lid.

The lid is attached to the base by means of a bifurcated hinge construction comprising a pair of ears 65 mounted on the lid 13 so as to extend from the circular plate 57 over the flattened portion 59. The ears 65 have openings for receiving the hinge pin 53, when the hinge support 49 is positioned between the ears 65. The hinge pin 53 is provided with pinched ends 69 which will retain it in position, as shown in FIGURES 1 and 5.

The lid 13 is also provided with a post 71 which extends from the inner surface of the lid and which has its axis aligned with the axis of the central bore 25 when the lid is in the closed position. A recess 73 is disposed around the post 71 and is adapted to receive a lead weight 75. The lead weight locates the center of gravity of the lid slightly inwardly toward the center of the bore when the lid is in the raised position and tends to cause the lid to close easily by joggling of the battery, should the lid be left in the raised position. A washer 77 is snugly fitted onto the post 71 and holds the lead weight 75 in the recess 73. The washer 77 and post 71 combine to form a plug which is proportioned to fit into the lip 39 of the bushing 31.

It will be noted from the drawings that the journal 51 of the hinge support 49 is located above the plane defined by the lip 39 of the bushing 31. Because of the positioning of these elements, when the lid is first opening, the plug formed by the post 71 and washer 77, rotates with the lid about the hinge pin 53 causing the lip 39 of the bushing 31 to flex (FIGURE 4).

The lip 39 serves to maintain the lid 13 in a closed condition, but does not make it necessary to fasten and unfasten the lid prior to raising it for servicing of the battery. If it were not for this feature, the lid would bounce open during a joggling of the battery with the possibility of the electrolyte splashing out through the service opening.

In addition, the inner diameter of the opening defined by the lip 39 is such that an effective seal is provided when the lid is in the closed position.

The upper surface of the lid 13 is provided with a grip or handle 79. The handle has a forwardly extending arm 81 to facilitate opening and closing, and a rearwardly extending arm 83 positioned to abut the rearward surface of the hinge support 49 of the base when the lid is opened. While in the illustrated embodiment, it is the cooperation of the rearward arm 83 of the handle 79 and the rearward edge of the hinge support 49 which determines the angle at which the lid will be supported when it is in the open position, other means may be provided on the lid 13 and base 11 to serve this function. It has been found that an angle of 5 degrees past the vertical, or an outer opening angle of approximately 95 degrees for a horizontally disposed base, is satisfactory for this construction.

In the use of the improved battery closure, the workman opens the lid 13 to test or fill the battery. If he leaves the lid open, normally the electrolyte of the battery will be lost by excessive evaporation and splashing. However, in most uses of such batteries, the battery is subjected to vibration and the lid of the battery closure will close. As the lid falls or is closed, the plug formed by the post 71 and washer 77 will fit within the opening defined by the lip 39 of the bushing 31. Then, having once closed, the location of the hinge pin 53 is such that the cooperation of the plug and the lip 39 will prevent the lid from opening in normal operation, and will provide an effective seal for the service opening.

An alternate means of fastening the closure in the battery is shown in FIGURE 6 and comprises generally an O-ring 83 disposed in an annular groove 85 on the outer periphery of the base 11. The O-ring is preferably of a resilient material and of a size which will resiliently fill and seal the service opening and hold the closure securely therein.

A battery closure has thus been described which has a hinged lid automatically closable due to vibrations of the battery, but which provides a tight seal when so closed. In this manner loss of lids as well as loss of electrolyte and consequent deterioration of the battery is prevented.

A closure has also been described which provides a protected breather duct for the escape of battery gases without interfering with the function of such a duct.

While only one embodiment of the invention has been specifically described in detail it should be clear that various changes are possible without departing from the scope of the present invention.

Various of the features of the above described invention are set forth in the following claims.

What is claimed is:

1. A top closure for the service opening of a storage battery case, which closure comprises a base portion which is adapted to be secured in said case and a lid hingedly mounted on said base, a passageway through said base portion, said passageway being provided with an inwardly extending pliable lip which defines an opening having pliable edges, which opening lies in a plane generally normal to the axis of said passageway, said lip being adapted to flex freely in directions generally parallel to the axis of said passageway as said lid is raised and lowered, said closure lid including a plug which is adapted to overlie and engage the upper surface of said flexible lip so as to prevent upward flexing of said lip when said lid is in the closed position, said plug also including a section which extends into the opening defined by said pliable lip, the edges of said pliable lip which define said opening engaging the periphery of the section of said plug which extends into said opening.

2. A top closure for the service opening of a storage battery case, which closure comprises a base portion which is adapted to be secured in said case and a lid hingedly mounted on said base, a passageway through said base portion, said passageway being provided with an inwardly extending pliable lip which defines an opening having pliable edges, which opening lies in a plane generally normal to the axis of said passageway, said lip being adapted to flex freely in directions generally parallel to the axis of said passageway when said lid is raised or lowered, a closure lid including a plug which is proportioned to overlie and engage the upper surface of said flexible lip so as to prevent upward flexing of said lip when said lid is in the closed position, said plug also including a section which extends into the opening defined by said pliable lip, the edges of said pliable lip which define said opening engaging the periphery of the section of said plug which extends into said opening, said lid having a depending flange adapted to cooperate with the lower surface of said lid and the top surface of said base to form a chamber, a portion of said flange being removed so as to permit communication between said chamber and the atmosphere, and a breather duct extending between said chamber and the lower surface of said base.

References Cited in the file of this patent

UNITED STATES PATENTS

| | | |
|---|---|---|
| 2,506,952 | Doughty | May 29, 1950 |
| 2,645,449 | Gulick | July 14, 1953 |
| 2,673,231 | Kennedy | Mar. 23, 1954 |